United States Patent [19]

Wakabayashi et al.

[11] 4,300,239
[45] Nov. 10, 1981

[54] OPTICAL REPEATER MONITORING SYSTEM

[75] Inventors: Hiroharu Wakabayashi, Tokyo; Yasuhiko Niiro, Yokohma, both of Japan

[73] Assignee: Kokusai Denshin Denwa Co., Ltd., Tokyo, Japan

[21] Appl. No.: 115,236

[22] Filed: Jan. 24, 1980

[30] Foreign Application Priority Data

Feb. 8, 1979 [JP] Japan .................................. 54-12806

[51] Int. Cl.³ ............................................. H04B 9/00
[52] U.S. Cl. ................................... 455/601; 455/606; 375/4; 350/96.13; 356/73.1
[58] Field of Search ............... 455/601, 606, 607, 608, 455/610; 350/96.12, 96.13, 96 H; 356/73.1; 343/6.5 R; 375/3, 4

[56] References Cited

U.S. PATENT DOCUMENTS 4,143,263 3/1979 Eichweber ........................ 455/606

FOREIGN PATENT DOCUMENTS 2012949 3/1979 United Kingdom ................ 455/601

OTHER PUBLICATIONS

M. Matsushita et al., "PCM-400M System Test Sets", Sep.-Oct. 1976, Review of the Electrical Comm. Laboratories, vol. 24, N.T.T. #9-10, pp. 802-811.

Primary Examiner—John C. Martin
Assistant Examiner—Edward L. Coles
Attorney, Agent, or Firm—Allan Ratner

[57] ABSTRACT

An optical repeater monitoring system for a digital signal transmission circuit utilizing an optical fiber transmission cable, in which a terminal station at the extreme end of the cable transmits the repeater recognition signal for designating the particular repeater to be tested and the test signal following immediately after said repeater recognition signal to the optical fiber transmission cable, the repeater thus designated by said repeater recognition signal composes the return optical path in the repeater by switching ON an optical switch for reflecting said repeater recognition signal and the repeater test signal to the terminal station, and the terminal station then analyzes the returned repeater test signal to determine the error rate of the digital signal in the cable.

2 Claims, 5 Drawing Figures

OPTICAL REPEATER MONITORING SYSTEM

BACKGROUND OF THE INVENTION

The present invention relates to a monitoring system of submarine repeaters for digital transmission circuits utilizing an optical fiber.

In an optical transmission circuit, neither light emitter elements nor light receiver elements have satisfactory linear characteristics, and an analog communication system which transmits an analog signal can not be implemented in the optical transmission circuit. Therefore, a digital transmission circuit which transmits a digital signal is presently under study for the application to an optical transmission circuit. Accordingly, none of the monitoring systems which have been utilized in a prior analog submarine cable system is applicable to an optical fiber submarine cable in a digital communication system.

Some of the prominent prior knowledge in the field of monitoring system of onshore digital PCM communication systems are, for instance, "the pulse trio system" disclosed in "the Review of Electrical Communication Laboratories" Vol. 14, No. 1 published by Nippon Telegraph & Telephone Public Corporation, Tokyo, Japan, "the phase detection system" or "AMI violation detecting system" disclosed in "the Review of Electrical Communication Laboratories", Vol. 24, No. 9-10.

However, the above prior arts have the disadvantage that an interstitial cable is necessary in addition to the main communication cable in order to designate the particular repeater and/or transmit a test signal to/from the repeater to be tested. If we try to introduce that interstitial cable system to an intercontinental optical fiber submarine communication system, additional repeaters for interstitial cable are necessary since such an intercontinental submarine cable is too long to transmit without a repeater. That additional repeater for interstitial cable makes the communication system complicated, and the interstitial cable must be as reliable as the main optical communication system. Further, the system is uneconomical since the cable structure is complicated.

On the other hand, it is true that various monitoring systems which do not employ interstitial cables but only the main cable have been proposed. However, none of them are free from the drawbacks itemized below.

(1) Since the system is designed to return a part of the repeater recognition signal itself directly as a test signal, an arbitrary test signal pattern can not be utilized but that test signal pattern is severely restricted.

(2) Since the system is designed to allocate a specific signal to the recognition of each of the repeaters, it is impossible to test all the repeaters with a common test condition, for example with a pattern commonly applicable to all the repeaters, and (3) Since the system is designed to return a signal by employing an electrical circuit assembled in a repeater, the main communication route is required to have a switch to be connected in series therein (for instance Japanese patent laid-open publication No. 51-99904). However, that electrical switch inserted in the main communication route reduces the reliability of the main communication route considerably.

On the other hand, the Japanese Patent laid-open publication No. 54-133001 discloses another system to solve the above problem. According to the system, a repeater recognition signal which is independent from a repeater test signal, is employed. When receiving the repeater recognition signal, an optical switch forms a return circuit in the repeater during a predetermined duration to allow a repeater test signal to return through the return circuit. The system is, however, involved with the disadvantages below.

(1) Since the duration that the signal is returned is predetermined and is limited to a rather short duration, it is essential to finish a repeater test within that predetermined duration, and so causing the system to be inflexible and inconvenient in operation, and (2) Adverse effects are assumed for the long term stability of a time constant circuit for defining said predetermined duration.

Another prior proposal returns the signal by an optical switch (no conversion from optical energy to electrical energy is performed), and the repeater test signal doubles as the repeater recognition signal. However, this system does not solve all the problems pointed out in the above, either.

SUMMARY OF THE INVENTION

It is an object, therefore, of the present invention to overcome the disadvantages and limitations of a prior repeater monitoring system by providing a new and improved optical repeater monitoring system.

It is also an object of the present invention to provide an optical repeater monitoring system in which a return path is composed of an optical switch instead of an electrical switch, and said optical switch is turned ON during the desired duration.

According to the present optical repeater monitoring system for a digital signal transmission circuit utilizing an optical fiber transmission cable, a terminal station at the extreme end of the cable transmits the repeater recognition signal for designating the particular repeater to be tested and the test signal following immediately after said repeater recognition signal to the optical fiber transmission cable, then, the repeater thus designated by said repeater recognition signal composes the return optical path in the repeater by switching ON an optical switch for reflecting said repeater recognition signal and the repeater test signal to the terminal station, and the terminal station analyzes the returned repeater test signal to determine the error rate of the digital signal in the cable.

Therefore, some of the important features of the present invention are;

(a) No interstitial cable is utilized for merely monitoring the system.

(b) The return path is provided by an optical switch, instead of an electrical switch. So, an optical-to-electrical conversion is not necessary for the purpose of the monitoring.

(c) The repeater test signal is completely independent from the repeater recognition signal.

(d) The signal return path by the optical switch is held during the entire time that the repeater test signal is transmitted.

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENTS

Figure 1:
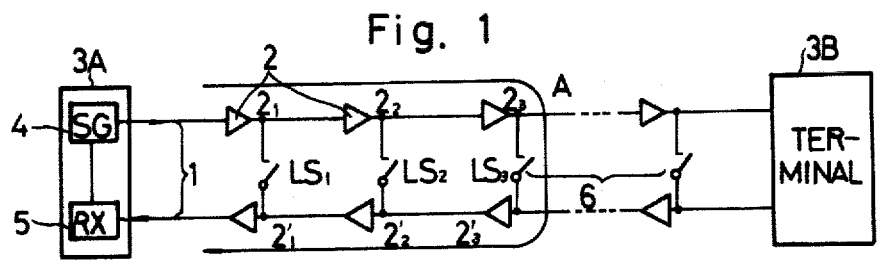
FIG. 1 is the schematic drawing of an optical communication system in accordance with the present invention.

FIG. 1 shows the preferable embodiment of the cable communication system according to the present invention. In the figure, the reference numeral 1 shows a submarine cable made of optical fiber, 2 are optical repeaters inserted in said submarine cable, 3A and 3B are terminal stations connected at the extreme ends of the submarine cable, and, of course, those terminal stations are installed on land. FIG. 1 shows the case in which each optical repeater is monitored from the terminal station 3A. It is of course clear that entirely the same operation is applicable to the case in which each optical repeater is monitored from the other terminal station 3B. The reference numeral 4 is a signal generator which sends out a repeater recognition signal for designating the particular repeater to be tested, and a repeater test signal which follows immediately after the recognition signal. Said recognition signal is, of course, allocated to each of the repeaters.

Each repeater has a recognition signal receiver, which closes an optical switch 6 upon receipt of said recognition signal from the signal generator 4. In the embodiment of FIG. 1, the third repeater from the left side is designated, and the optical switch $LS_3$ of the third repeater is closed, while other optical switches installed in other repeaters are open since no recognition signal for designating those repeaters is recognized. The designated optical switch $LS_3$ is kept closed while the designated repeater $2_3$ receives said recognition signal and the following repeater test signal. Accordingly, the repeater test signal from the terminal 3A following the recognition signal returns to the signal receiver 5 installed in the terminal station 3A passing through the third repeaters $2_3$, and $2_3'$ as shown by the arrow A in FIG. 1. The signal receiver 5 in the terminal station 3A compares the signal generated by the signal generator 4 with the corresponding signal which has returned through the return circuit formed by the optical switch in the designated repeater. And, according to the result of the comparison, the signal repeater 5 determines the error rate of a digital signal in the submarine cable.

In this way, it is possible to measure the error rate of each repeater by means of such an extremely simple process as described in the above explanation. It should be appreciated that the test pattern according to the present invention can be selected arbitrary, and all the repeaters can be tested with the common test pattern. Further, provided that the power supply is available, the present invention can allocate the fault repeater even when the cable is broken or cut.

Figure 2:
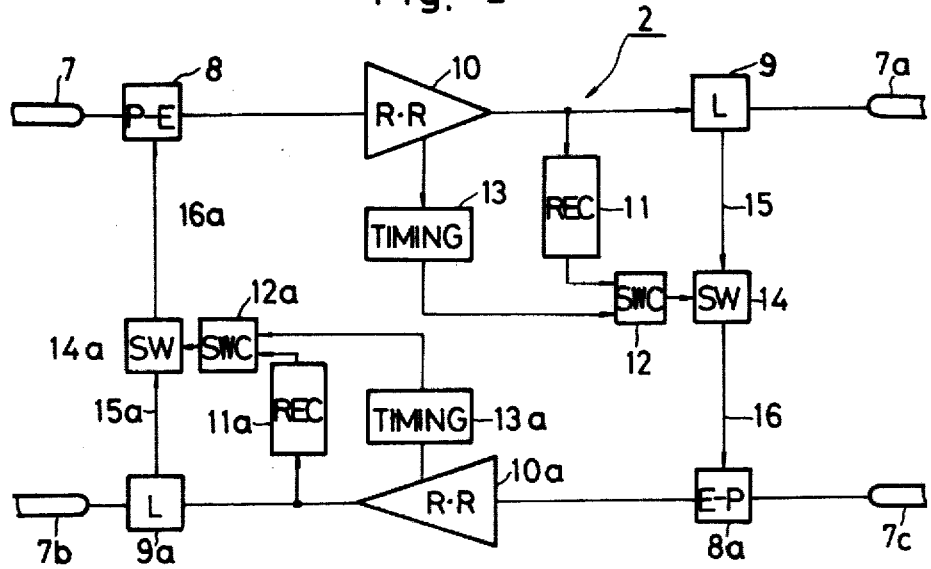
FIG. 2 is a block diagram of an embodiment of an optical repeater in accordance with the present invention.

FIG. 2 is a block diagram of an embodiment of an optical repeater according to the present invention. It should be noted that the repeater can repeat the signals in both directions, that is, the direction from the first terminal station 3A to the second terminal station 3B and the opposite direction. In the figure, the reference numerals 7, 7a, 7b and 7c are main communication cables made of an optical fiber with small loss. 8 is the first light receiver element connected to the end of the optical fiber 7 for converting the optical energy from the cable 7 to an electrical signal. The first light receiver element 8 also performs the connection between the main communication path and the return communication path 16a. The electrical signal converted from an optical signal is repeated and/or amplified by the first regenerative amplifier 10, the output of which is applied to the first light emitter element 9 and the first repeater recognition signal receiver 11 which provides the output upon receipt of the predetermined pattern designated to the repeater. The first light emitter element 9 converts an electrical signal to an optical signal. The major portion of the converted optical signal power is led to the optical fiber communication cable 7, and the minor portion of the converted optical signal power is led to an optical fiber path 15 which forms a return circuit. Since only a minor portion of the optical signal power is returned, the influence of the presence of the monitoring circuit to the main communication path is neglected. The first repeater recognition signal receiver 11 receives the output of the regenerative repeater 10, and when said receiver 11 receives the recognition signal designated to the repeater, the receiver 11 applies the control signal to the first optical switch control circuit 12 which is then turned ON. On the other hand, the first timing signal detection circuit 13 which is connected to the regenerative repeater 10 detects the timing signal which comprises the repeater recognition signal and the repeater test signal, and upon detection of the stop of the timing signal, the timing signal detection circuit 13 makes the optical switch control circuit 12 OFF. When the optical switch control circuit is reset, its output resets the switch 14 OFF and the return path is disconnected. Accordingly, the optical switch 14 is held ON and the return path is maintained while the repeater receives either the recognition signal or the repeater test signal, and the return path from the light emitter element 9 to the light receiver element 8a through the optical fiber 15, the optical switch 14 and the optical fiber 16 is maintained during that duration. When the repeater test signal from the terminal station 3A stops, the timing in the repeater also stops, then, the optical switch 14 is turned to OFF, and said return path is also disconnected. Generally speaking, the time from the stop of the test signal to the stop of the timing signal is approximately 1 μs, so the time which must be spared between two independent tests for another repeaters or the guard time can be minimized.

Similarly, the second light receiver element 8a, the second light emitter element 9a, the second regenerative amplifier 10a, the second repeater recognition signal receiver 11a, the second optical switch control circuit 12a, the second timing signal detection circuit 13a, the second optical switch 14a, and the second optical fibers 15a and 16a are provided. Those second ones are utilized for the repeater operation and/or the repeater monitoring operation in the opposite direction.

Figure 3:
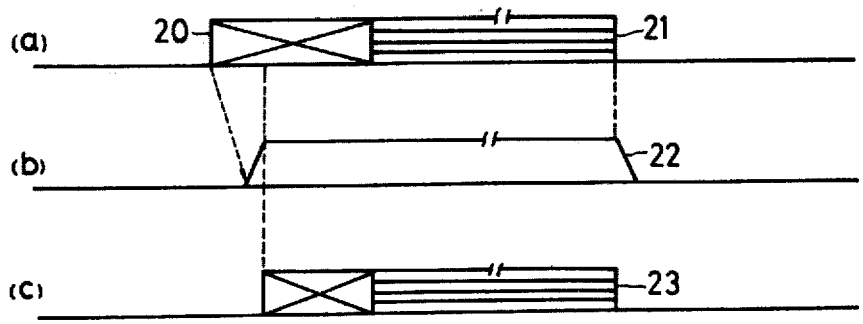
FIG. 3(a), FIG. 3(b) and FIG. 3(c) are time charts showing the sequential operation of an optical repeater monitoring system in accordance with the present invention.

FIG. 3 shows the time chart showing the sequential operation of the system according to the present invention. Referring to FIG. 3, (a) shows a group of signals including the repeater recognition signal 20 and the repeater test signal 21 from the terminal station on land. As shown in (b), the optical switch circuit is held ON during the time from the recognition of the recognition signal 20, to the end of the test signal 21. The time period that the switch is held ON is shown by the reference numeral 22. The reference numeral 23 in (c) shows the situation of the return signal, which has the latter portion of the recognition signal 20 and all of the test signal 21.

The optical switch control circuits 12 and 12a can be easily composed by employing ordinary flip-flop circuits. The flip-flop circuit facilitates the recovery from an abnormal incident by stopping the power supply when the return path is not reset by said abnormal incident.

As an optical switches 14 and 14a, any type of mechanical optical switch can be utilized in the present invention.

As explained above, according to the present invention with the optical switch and the control circuit for the optical switch, the following effects are expected.

(a) An arbitrary pattern can be utilized as a repeater test signal.

(b) All the repeaters can be tested with the common test signal pattern.

(c) The time period for testing any repeater can be designed arbitrary.

(d) The length of the guard time between the end of the test of the preceding repeater and the start of the present repeater, can be extremely short.

(e) The reliability of the main communication route is not deteriorated due to the addition of the monitoring circuit, since the return path in a repeater is connected or disconnected to or from the main route without disconnecting the main optical route.

(f) Upon an accidental incident that a cable is broken, the present system is useful for locating the faulty point, provided that the power supply is available, and (g) An optical switch inherently allows an extremely larger amount of ON-OFF ratio of optical power in comparison with any electrical or semiconductor type switch.

From the foregoing it will now be apparent that a new and improved optical repeater monitoring system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. An optical repeater monitoring system for a digital transmission circuit inserted in an optical fiber transmission line comprising;
   (a) a terminal station transmitting a repeater recognition digital signal for designating a particular repeater to be tested and a test digital signal following immediately after said repeater recognition signal to said optical fiber transmission line,
   (b) the repeater designated by said repeater recognition signal having a return optical path in said transmission line provided by an optical switch in said repeater to be turned ON during said repeater recognition signal and said test signal,
   (c) said optical switch being turned ON when said repeater detects said repeater recognition signal, and turned OFF when said repeater detects termination of said repeater recognition signal and said repeater test signal,
   (d) said return path reflecting said repeater recognition signal and said repeater test signal to said terminal station, and
   (e) said terminal station comparing said test signal which is transmitted with said test signal which is reflected from said repeater and determining an error rate in said transmission line.

2. An optical repeater monitoring system for a digital transmission circuit inserted in an optical fiber transmission line comprising
   (a) a terminal station transmitting onto said transmission line an optical signal containing a repeater recognition signal and a repeater test signal,
   (b) a light receiver element coupled to said transmission line for converting said optical signal into an electrical signal,
   (c) a regenerative amplifier for regeneration and amplification of said electrical signal, said amplifier coupled to an output of said light receiver element,
   (d) a light emitter for converting said electrical signal into said optical signal, said light emitter coupled between an output of said amplifier and said transmission line,
   (e) a timing signal detection circuit coupled to said output of said amplifier for deriving said repeater recognition signal and said repeater test signal,
   (f) a repeater recognition signal detector for detecting said repeater recognition signal, said detector coupled to said output of said amplifier,
   (g) an optical switch control for turning ON an optical switch upon detecting said repeater recognition signal by said detector and for turning OFF said optical switch upon detecting termination of said repeater recognition signal and said repeater test signal by said timing signal detection circuit,
   (h) said optical switch connecting a portion of said optical signal from said light emitter to an optical return path in said transmission line for reflecting said optical signal to said terminal station.

* * * * *